United States Patent [19]

Daigger et al.

[11] Patent Number: 4,867,883

[45] Date of Patent: Sep. 19, 1989

[54] HIGH-RATE BIOLOGICAL WASTE WATER TREATMENT PROCESS USING ACTIVATED SLUDGE RECYCLE

[75] Inventors: Glen T. Daigger, Englewood, Colo.; James R. Borberg, Virginia Beach; Liliana M. Morales, Reston, both of Va.

[73] Assignee: Hampton Roads Sanitation District of the Commonwealth of Virginia, Virginia Beach, Va.

[21] Appl. No.: 205,858

[22] Filed: Jun. 13, 1988

Related U.S. Application Data

[63] Continuation of Ser. No. 40,826, Apr. 21, 1987, abandoned.

[51] Int. Cl.$^4$ .............................................. C02F 3/30
[52] U.S. Cl. .................................. 210/605; 210/622; 210/630; 210/903; 210/906
[58] Field of Search ............... 210/605, 612, 614, 622, 210/624, 626, 630, 903, 906

[56] References Cited

U.S. PATENT DOCUMENTS

| | | | |
|---|---|---|---|
| 4,183,809 | 1/1980 | Klopwijk et al. | 210/903 X |
| 4,522,722 | 6/1985 | Nicholas | 210/605 |
| 4,655,925 | 4/1987 | Tabata et al. | 210/906 X |

Primary Examiner—Tom Wyse
Attorney, Agent, or Firm—Nixon & Vanderhye

[57] ABSTRACT

A high-rate biological waste water treatment process for removing organic matter, phosphorus and nitrogen nutrients from municipal waste water comprising the steps of mixing the influent waste water in an initial anaerobic reactor zone to maintain the biological solvents in suspension with a denitrified mixed liquor from a downstream anoxic reactor zone, typically at a flow rate of 0.5 to two times the waste water flow rate. The reactor zone serves to select microorganisms capable of accumulating quantities of phosphorus in excess of that required for simple cell growth and reproduction. The phosphorus removal occurs due to the removal of excess sludge (waste activated sludge) produced in the process wherein such sludge can be removed from the clarifier underflow or as a mixed liquor directly from the biological reactor.

14 Claims, 4 Drawing Sheets

Effect of Wastewater TBOD/TPO$_4$ on Effluent Soluble Phosphate

HIGH-RATE BIOLOGICAL WASTE WATER TREATMENT PROCESS USING ACTIVATED SLUDGE RECYCLE

This is a continuation of application Ser. No. 040,826 filed Apr. 21, 1987, abandoned.

FIELD OF THE INVENTION

The present invention relates to improvements in the treatment of municipal and industrial waste water using activated sludge and, in particular, to an improved treatment process for removing organic matter (generally expressed as BOD), as well as phosphorous and nitrogen nutrients at a high rate from waste water using an activated sludge recycle.

BACKGROUND OF THE INVENTION

During recent years, the discharge of treated effluents has necessitated high waste water treatment requirements at both the state and federal levels. Of particular concern is the increase in phosphates and nitrogen in the effluents which result in water bodies becoming enriched with plant nutrients causing a proliferation of water plants and algae which, in turn, result in various water purification and health problems. The effective removal of pollutants from waste waters, particularly carbonaceous materials and nutrients such as nitrogen and phosphorus, has also become increasingly important in efforts to supplement and reuse existing municipal water resources.

The presence of organic materials in water also results in fungal and other heterotrophic growths, deoxidation of the water (due to the metabolic activities of the growths) which render the water unsuitable for higher life forms such as fish, anaerobic conditions causing fermentation and redissolution of heavy metal salts. These net effects reduce the aesthetic appearance, recreational use and reuse of the water.

In the past, a wide range of physical, chemical and biological processes have been proposed for eliminating pollutants in existing waste water streams, particularly carbonaceous material and unwanted nutrients. Other efforts focused on the reduction of total suspended solids in treated effluents. The so-called "biological" nutrient removal processes are particularly attractive for the treatment of municipal waste waters since such treatment costs are generally less than the physical/chemical methods and the characteristics of the waste water are amenable to biological treatment.

In that regard, it has long been known that the quality of effluent may be improved under aerobic conditions in which bacteria metabolize the biodegradable organics, using dissolved oxygen as their terminal electron acceptor. Approximately one-third of the metabolized organics are oxidized to carbon dioxide and water to obtain the energy to convert to the remaining two-thirds of the organics to microbial protoplasm. The major problem in basic aerobic treatment is the enlarged volume of microbial solids to be processed.

In anerobic systems, i.e., those operated in the absence of dissolved oxygen, the bacteria must find another electron acceptor. Chemically bound oxygen becomes the primary electron acceptor such as, when nitrates are reduced to nitrites and various intermediates before being reduced to nitrogen gas. The denitrification results in the eventual production of nitrogen gas which is insoluble in the waste water rather than in the production of ammonia or ammonium ions.

Because of the need to reduce the level of organic pollutants as well as nutrients such as nitrogen and phosphorous, many conventional "biological" waste treatment systems have combined aerobic and anaerobic steps, generally with the anerobic stage being the initial treatment step. One principal difficulty encountered with combined processes is that time becomes a critical variable in designing and sizing the waste water treatment system. A definite time period is required to metabolize a given amount of organic matter by a unit of cell mass. By retaining the microbes in the treatment system, the treatment time per unit of organic matter is reduced. Because the time for aerobic treatment is controlled by oxygen transfer, contact between the microbes and the organic pollutants controls the total reaction time.

Unfortunately, the kinetics of nitrogen and phosphorous removal under anaerobic conditions are not always compatible with the treatment and removal of organic materials in an aerobic environment. For example, the rate of removal of phosphorous is a direct function of the concentration of organics. Thus, it is important to maintain higher concentrations of residual organics at a point during the process when phosphorous uptake rates can be optimized. As a result, the design of systems capable of using combined treatment mechanisms (aerobic, anaerobic and anoxic) have often been unduly complicated and expensive to install and operate.

During recent years, the activated sludge process has proven to be an effective means for removal of biological oxygen demand (BOD) from waste water and for producing high quality effluent with reduced total suspended solids concentrations. The process has been extensively described in the literature and, in general, includes the steps of maintaining an aeration system in which the waste water is fed to a suspension of microorganisms which are responsible for removing excess bacteria and producing a clarified effluent.

Because bacteria cannot metabolize solid organics, they convert certain solid particles to soluble organics prior to metabolism by virtue of enzymes on the cell surface capable of hydrolizing the complex organics to simple organic molecules. It is known that the bacteria mutt have a suitable environment with all of the proper nutrients. The environment must also provide good mixing for adequate contact between the microorganisms and the pollutants being metabolized and may involve an aerobic system with excess dissolved oxygen or an anaerobic system without dissolved oxygen. In either case, the known activated sludge processes require sufficient nitrogen, phosphorous, iron and trace metals for good growth of the microorganisms, without high concentrations of heavy metals.

One of the major problems with conventional activated sludge systems lies with filamentous microbes which adversely effect sedimentation. For example, in the absence of adequate oxygen and iron, filamentous bacteria can predominate over normal bacteria. The proliferation of filamentous species which do not settle adequately in the clarifier produce a filamentous biomass which is difficult and expensive to separate from the treated waste water.

Another problem with conventional activated sludge processes is that they often are not effective in removing nitrate and phosphate compounds from the waste water being treated. In the past, several modifications to the basic activated sludge process have resulted in modest improvements in phosphate removal. However, such processes have not proven to be as effective or economical as desired because they require long mean cell residence times and therefore result in larger and more expensive processing equipment, particularly the biological reactors. Thus, the prior methods have not been successful in reducing the degree of nitrate and phosphate compositions within the waste water while simultaneously improving the overall efficiency and throughput of the treatment system.

One early attempt to use an activated sludge process for the biological removal of phosphates and nitrogen was proposed in 1976 and is commonly referred to as the "phoredox" process in which an anaerobic state is created in such a way that phosphate is released, resulting in a biological uptake of phosphate in excess of the normal metabolic requirements induced when the sludge is aerated. The anaerobic state results from mixing the influent waste stream with the sludge recycled from the secondary settling tank without aeration in an anaerobic tank at the start of the process.

More recent activated sludge processes sought to increase the removal of phosphates and solve the problem of filamentous material in the biomass. One such process is described in U.S. Pat. No. 4,056,465 which attempts to control sludge "bulking" by returning settled sludge from a clarifier to an initial anaerobic contact zone. The initial anaerobic zone may be followed by an oxygenated aerobic zone or, alternatively, an anoxic zone for effecting denitrification may be interposed between the anaerobic and the oxygenated aerobic zone. Anaerobic conditions are strictly maintained during an initial stage which mixes incoming waste water and recycled sludge from secondary clarification. The result is an avoidance of the proliferation of high surface area microorganisms and the removal of substantial quantities of incoming BOD which are absorbed from the incoming effluent by microorganisms which have the capability of doing so under anaerobic conditions.

Another recent development, known as the UCT process, was developed by the University of Cape Town during the mid-1980's and discloses the recycle of activated sludge to the anoxic zone of the system, together with a recycle of nitrified recycle to the anoxic zone and a third recycle from the anoxic zone itself to the anaerobic zone.

One of the principal drawbacks with the process described in U.S. Pat. No. 4,056,465 is that the recycle of activated sludge in the prescribed manner results in comparatively lower phosphorous removal capability, even though the patent achieves its principal objective of producing an improved settling sludge. Another disadvantage of known activated sludge systems is that they invariably require very long mean cell residence times in order to fully and adequately treat the influent. For example, the UCT process typically requires upwards of 20 days in order to accomplish the desired phosphate, nitrate, and BOD levels.

It is has now been found that biological waste water can be treated at a much higher rate, i.e., with a much lower mean cell residence time, by using an activated sludge recycle in a staged reactor system in accordance with the present invention. That is, it has now been found that organic matter, phosphorous and nitrogen nutrients may be removed from municipal waster water in a far more efficient manner than in known prior art processes.

The superior performance achieved by the process according to the invention results from two critical improvements over the known activated sludge methods. First, the present invention uses a unique multi-stage reactor configuration for the anaerobic, anoxic, and aerobic zones. Second, the process operates in a very high-rate mode, i.e., with much lower hydraulic residence times and far greater throughput than conventional systems.

The use of a multi-stage reactor configuration in accordance with the invention takes advantage of the inherent kinetics of phosphorus removing bacteria. In the anaerobic zone, the phosphorus removing bacteria remove soluble organics from the influent waste water. Because the uptake rates are a function of the concentration of organics, the rates become accelerated by using a series of small, complete mixed reactors, rather than a single, large mixed reactor. Thus, the overall rate of phosphorous uptake is accelerated because the concentration of residual organics remains relatively high in the first few reactors. As detailed below, the observed results show extremely high rates of organic matter uptake which, in the anaerobic zone, correspond to high phosphorus release.

It has also been found that the staging in accordance with the present invention is a significant factor in the anoxic zone, but for a different reason. In the anoxic zone, the objective is to obtain complete denitrification so that essentially no nitrate is recycled to the anaerobic zone through the anoxic recycle. The unique staging and use of recycle according to the invention helps to accomplish that desired result because most of the denitrification occurs in the first stage of the anoxic zone. Thus, little nitrate passes into the last stage of the anoxic zone, and even less into the anaerobic zone.

The high throughput of treated effluent in the process according to the invention maximizes the phosphorus removal capabilities and results in a system with a much higher proportion of active bacteria (often referred to as "active mass"). Because the biomass is biologically more active, required removal rates may be accomplished using much smaller reactors, thereby substantially reducing the size and cost of an effective waste water treatment system.

The observed results according to the invention also suggest fundamental differences in the kinetics of phosphorus removal for high-rate and low-rate processes. It has now been discovered, for example, that phosphorus removal is adversely affected by an aerobic hydraulic residence time greater than 4 hours. Conventional activated sludge processes, particularly the UCT process, would typically use an aerobic hydraulic residence time far greater than 4 hours. The longer residence times lead to lower energy levels in the phosphorus removing organisms and poorer phosphorus removal kinetics and may be caused by overoxidation of stored organic material.

Briefly, the process according to the invention includes the following steps. Process influent (municipal waste water which may or may not have received primary treatment) enters an initial anaerobic reactor zone with mixing (but with no aeration) to maintain biological solids in suspension. Denitrified mixed liquor from the downstream anoxic reactor zone is added to this initial zone, typically at a flow rate of 0.5 to two times the waste water influent flow rate. The anaerobic reactor zone contains microorganisms capable of accumulating quantities of phosphorous in excess of that required for simple cell growth and reproduction. The hydraulic residence time in this zone, based on the waste water flow, is typically 0.5 to 2 hours.

The combined waste water and denitrified mixed liquor flows to a downstream anoxic reactor zone, which is also mixed but not aerated. Settled sludge ("return activated sludge") from the clarifier and nitrified mixed liquor from the downstream aerobic zone are also added to this zone. In the anoxic zone, nitrate-nitrogen contained in the return activated sludge and nitrified mixed liquor serve as a terminal electron acceptor for denitrifying microorganisms and is converted to nitrogen gas. This gas is released to the atmosphere in the anoxic reactor zone and in the downstream aerobic zone, thereby resulting in nitrogen removal. Return activated sludge flow rates typically range from 0.5 to 2 times the influent waste water flow. Nitrified recycle rates vary depending on the degree of nitrogen removal desired, although they seldom exceed 4 times the influent waste water flow. The hydraulic residence time in the anoxic reactor zone is typically 0.5 to 2 hours.

The effluent from the anoxic zone then flows to the aerobic reactor zone. Dissolved oxygen is added by mechanical and/or compressed air diffusion means to maintain a residual dissolved oxygen concentration of 0.5 mg/l or more. In the aerobic reactor zone, nitrifying organisms convert ammonia-and organic-nitrogen originally present in the influent waste water to nitrate-nitrogen. Uptake of residual organic matter and phosphorus also occurs in this zone.

Finally, effluent from the aerobic zone flows to the clarifier where the biological solids settle, a portion of which may be returned to the biological process leaving a clear supernatant with reduced levels of organic matter, phosphorus, and nitrogen. This supernatant is removed and becomes the process effluent. Phosphorous removal occurs due to removal of excess sludge (waste activated sludge) produced in the process which can be removed either from the clarifier underflow, as shown in the accompanying Figures, or as mixed liquor directly from the biological reactor.

The mixing pattern in the various reactor zones represent some degree of plug flow as characterized by a sequence of complete mix reactors. The reactor zones may be physically separate structures, or segments within a single structure.

The process according to the present invention varies from the prior art processes in two important respects. First, unlike U.S. Pat. No. 4,056,465, the process does not relate primarily to the control of sludge bulking. Second, the present invention does not require the return of settled sludge from the clarifier to an initial anaerobic contact zone, but instead utilizes settled sludge in recycle to the anoxic zone. Theoretically, this recycle could compromise sludge settling characteristics. However, it has been found that it actually optimizes phosphorus removal due to the nitrate recycle to the anaerobic zone which has been minimized. In the process of U.S. Pat. No. 4,056,465, nitrate contained in the activated sludge recycle is added directly to the anaerobic zone. In contrast, the process according to the invention uses only denitrified mixed liquor added to the anaerobic zone. Nitrate addition to the anaerobic zone is thought to adversely effect phosphorus removal. Thus, the recycle produces a consistently good settling sludge and accomplishes superior phosphorus removal in comparison to the prior art waste water treatment processes with a BOD/TPO$_4$ ratio of less than 20.

In addition, in contrast to the prior art processes, particularly the University of Cape Town process, the present invention calls for a mean cell residence time (defined as the mass of solids in the biological reactor divided by the mass of solids removed from the process on a daily basis) of approximately six days for reactor temperatures of 20° C. or greater and twelve days for reactor temperatures between 10° C. and 20° C. Such reduced residence times are a substantial improvement over the existing known methods for waste water treatment using activated sludge recycle.

Thus, it is an object of the present invention to provide for an improved activated sludge waste water treatment system in which the concentrations of influent phosphorous and nitrogen nutrients are significantly reduced.

It is a further object of the present invention to provide a waste water treatment system using activated sludge in which the hydraulic residence time for treated effluent is significantly reduced in comparison to prior art processes.

It is a further object of the present invention to remove significant amounts of suspended solids at a much higher rate than conventional processes.

It is still a further object of the present invention to provide an improved biological treatment process which results in significant reductions in the required equipment size and cost.

DETAILED DESCRIPTION OF THE PRESENTLY PREFERRED EXEMPLARY EMBODIMENT

Figure 1:
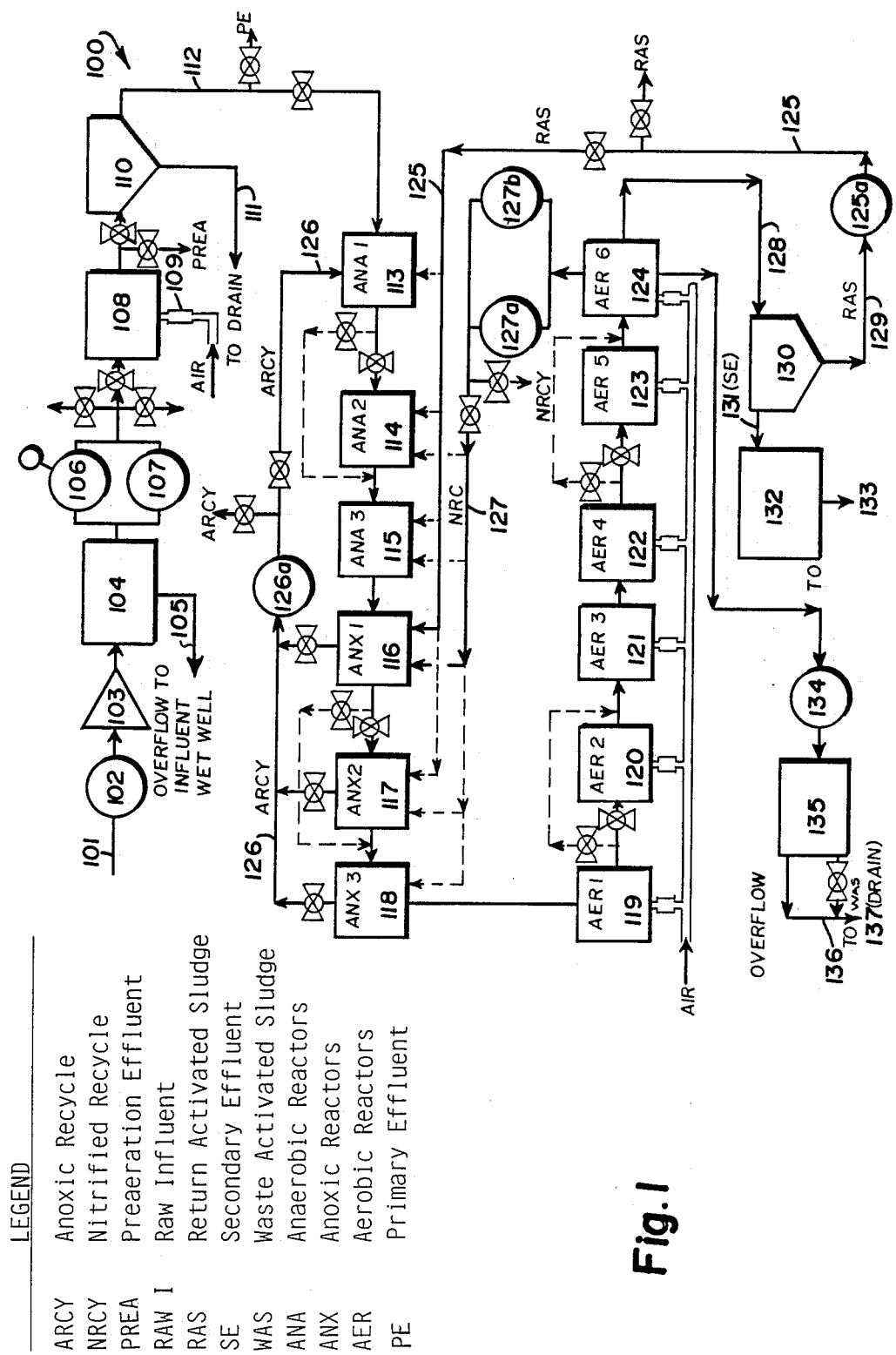
FIG. 1 of the drawings is a block flow diagram showing the basic process steps in accordance with the present invention.

With respect to FIG. 1 of the drawings, the basic treatment steps and equipment necessary for carrying out the activated sludge treatment method according to the present invention is shown generally as 100. The process flow diagram of FIG. 1 depicts the steps and equipment used in the pilot plant program (discussed, infra), and represents the complete liquid process schematic, including the steps of screening, preaeration, primary clarification, biological treatment and secondary clarification.

Pilot plant influent (shown as 101) consisting of raw plant influent waste water is continuously fed to a conventional grinder pump 102 positioned upstream of influent screens 103 which include fine mesh screens designed to protect the downstream pilot plant facilities from plugging. The screened waste water passes into a large holding tank 104 (known in the art as a "day tank"), with overflow directed in a continuous manner to the drain system (shown generally as 105) for eventual recycling and treatment. The waste water is pumped from the day tank to the treatment plant using progressive cavity pumps 106 and 107 into preaeration facilities consisting of a square high density polyethylene Nalgene container 108 which allows the influent to undergo preaeration for a specified time period (in the case of the pilot plant, an average hydraulic residence time of about 50 minutes). The air is metered through rotometer 109 and introduced into preaeration tank 108 through a fine bubble ceramic tube diffuser (not shown).

Following preaeration, waste water flows by gravity into the circular primary clarifier 110. The clarifier contains a galvanized steel effluent collection launder and includes means for removing sludge manually from the bottom of the clarifier through a valve and hose into line 111.

After primary clarification, the influent flows via line 112 to a series of biological reactors (also shown in detail in FIG. 2 of the drawings) consisting of twelve completely mixed cells in series shown as items 113, 114, 115, 116, 117, 118, 119, 120, 121, 122, 13 and 124, respectively. Each cell consists of one polyethylene Nalgene container as described above. Dye testing is conducted during start-up in order to verify that each cell is completely mixed and that the overall configuration provides an approximate plug flow pattern.

Anaerobic cells 113, 114 and 115, and anoxic cells 116, 117 and 118 are mixed using submerged mechanical mixers (not shown), with the mixing adjusted to maintain biological solids in suspension while minimizing oxygen transfer into the mixed liquor. The anaerobic and anoxic cells are not normally covered (except during wintertime operation) and thus are not operated under air-tight conditions. Air is added to each aerobic cell through a single fine bubble ceramic diffuser (not shown) identical to that used in the preaeration cell, with the air being metered into each cell through a conventional rotometer.

FIG. 1 thus depicts an exemplary reactor design using three anaerobic cells, three anoxic cells, and six aerobic cells shown as items 119, 120, 121, 122, 123 and 124. As those skilled in the art will appreciate, flexibility may be provided in the reactor configuration by using interconnecting piping system to vary the number of tanks in service. For example, bypass piping may be provided to allow the second anaerobic cell 114, the second anoxic cell 117, and the second and fifth aerobic cells 120 and 123, to be taken out of service, if desired. Recycle streams in the form of return activated sludge (shown as 125), anoxic recycle 126, and nitrified recycle 127 are conveyed using progressing cavity pumps 125a, 126a, 127a and 127b, respectively, through flexible hoses. This allows the location for recycle flows to be easily changed, resulting in various operating modes and process configurations.

FIG. 1 also illustrates the typical operating mode maintained throughout a normal reaction cycle. Typically, two anaerobic, two anoxic, and six aerobic cells are operated, providing a hydraulic residence time of about 6.5 hours (based on an average influent flow for pilot plant operations of 1.8 gpm). The return activated sludge and nitrified recycle flow are directed to the first anoxic cell 116 and anoxic recycle flow 126 is directed to the first anaerobic cell 113. In alternative embodiments, the number of cells in service may be varied depending on the desired effect on process performance characteristics.

Figure 2:
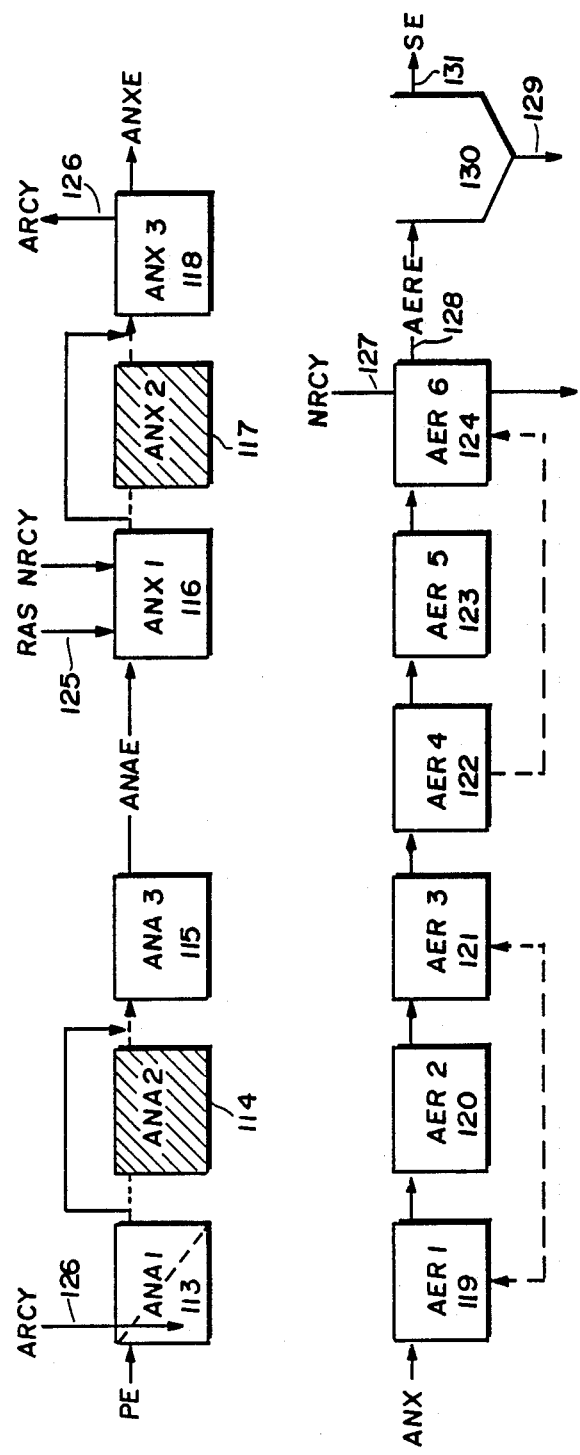
FIG. 2 is a simplified process flow diagram depicting an exemplary embodiment for the anaerobic, anoxic and aerobic reactor cells used in accordance with the present invention.

FIG. 2 of the drawings represents a block-flow diagram for a portion of the pilot plant program at the end of Phase I in which reactor cell 114 (ANA2) was removed from service by using the illustrated bypass piping which served to reduce the total anaerobic liquid volume. The desired plug flow (but with increased staging) was accomplished by placing a baffle in the first anaerobic cell (see the dashed diagonal line through cell 113), thereby creating a shorter initial contact zone. FIG. 2 also illustrates the use of a third anoxic reactor cell 117 (ANX2) during Phase IV-D of the pilot plant program. The results of these reactor configuration changes on overall process performance are represented in the various Tables discussed below.

Mixed liquor 128 from the complete biological reactor, i.e. the series of reactor cells, flows to secondary clarifier 130 having a similar construction as the primary clarifier. Settled solids are removed from secondary clarifier 130 through line 129 by a progressing cavity pump 125a which operates continuously. A scum baffle (not shown) may be provided to minimize scum carryover into the secondary effluent. The clarifier effluent 131 flows b gravity to storage tank 132, and then to the plant drain system 133.

Waste activated sludge is pumped by a progressing cavity pump 134 from the last aerobic cell of the biological reactor (typically cell 124) and delivered to a waste activated sludge holding tank 135. Both the pump speed and pumping cycle must be adjusted to control the total volume of waste activated sludge removed from the process. Typically, waste activated holding tank 135 consists of a Nalgene container identical to that used for the preaeration tank and the biological reactor cells. Tank 135 permits accurate measurement of the daily waste activated sludge volume and provides a source of "seed sludge" in the event upsets or mechanical failures lead to significant solids loss. The volume of waste activated sludge pumped to holding tank 135 should be measured daily and used to adjust the setting on pump 134. Collected sludge 136 is then discharged to drain system 137. An overflow may also be provided on tank 135.

EXAMPLE I

The activated sludge process according to the present invention was demonstrated by a pilot plant study segregated into a series of phases during which the overall conditions and operating objectives were held relatively constant. The general objective of the pilot plant program was to construct a test facility that would provide a reasonable simulation of a full-scale plant facility.

A nominal two gallon-per-minute (gpm) capacity was selected for the pilot plant study, based on the minimum primary and secondary clarifier size considered acceptable. The aeration basin consisted of a series of completely mixed tanks arranged in series, each having the required mixing, aeration, and recycle pumping facilities. The combined pilot plant unit processes included preaeration, primary clarification, biological treatment, and secondary clarification.

Feed to the pilot plant consisted of actual raw plant waste water in order to test the effects of factors such as toxic shock loads and dilute waste waters on process performance. The influent waste water was also varied on a diurnal basis in a fashion similar to that experienced at the plant from which the influent originated.

Figure 3:
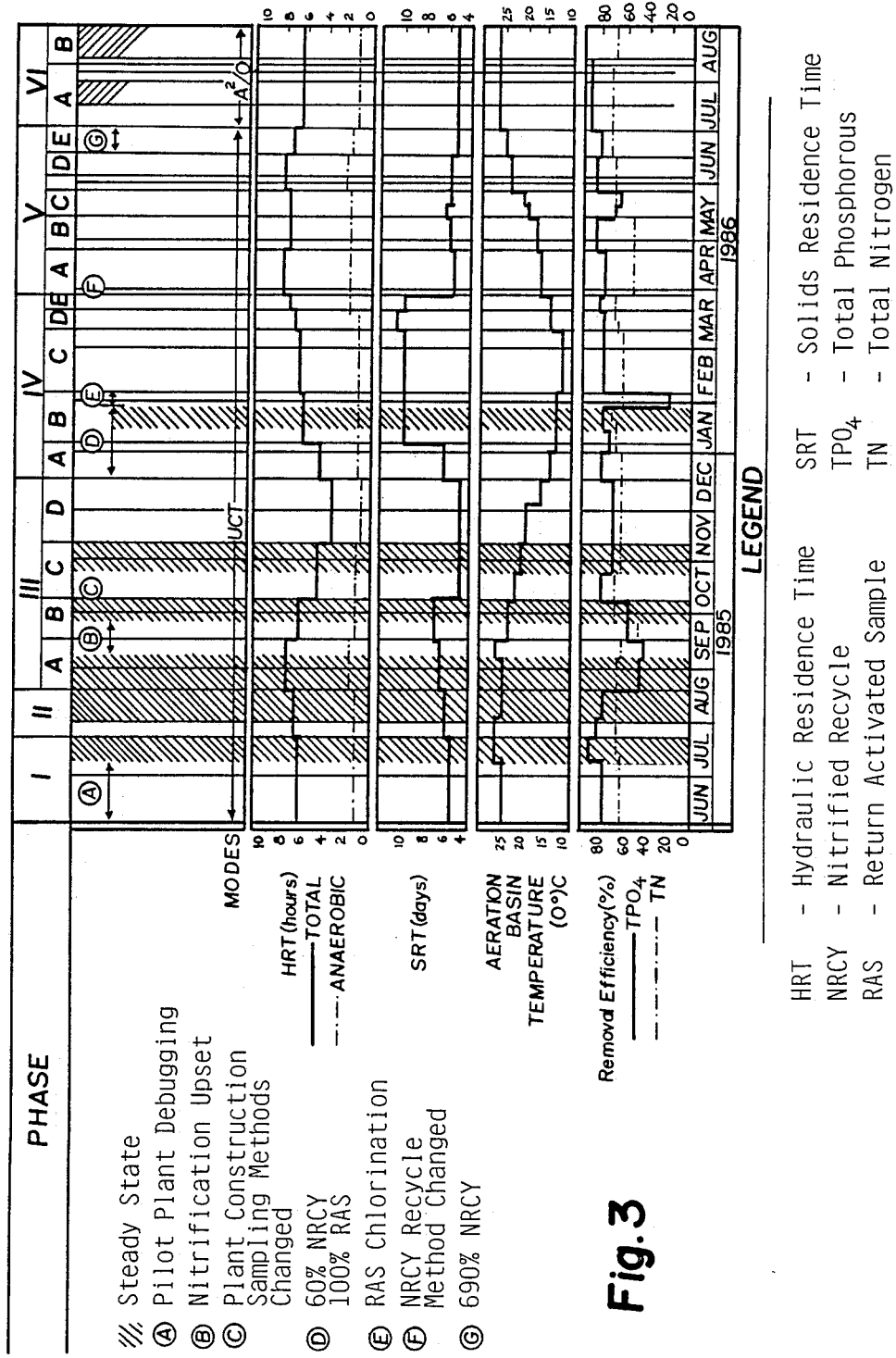
FIG. 3 is a graphical representation of the operating conditions and performance characteristics of a pilot plant study conducted in accordance with the invention.

FIG. 3 of the drawings shows the operating periods, including plant performance, and a listing of major operation factors and occurrences during each of the successive phases of the pilot plant study.

Phase I of the pilot plant operation established baseline performance under constant flow conditions. As indicated above, diurnal influent flow variations were maintained for all phases except Phase I. Constant flow conditions, i.e., no diurnal variations were maintained for all recycled flows throughout Phases I-VI.

Phase II of the pilot plant program established baseline performance conditions under diurnal flow conditions; Phase III determined the effects of process loading on process performance during warm weather conditions; Phase IV involved process performance during wintertime operating conditions; Phase V determined the effect of alternative reactor configurations and solids handling recycles on process performance; and Phase VI determined performance characteristics of the pilot plant program when operated in the "$A^2/O$" mode, i.e., in accordance with the teachings of U.S. Pat. No. 4,056,465.

During Phases I through IV-C, two anaerobic cells, two anoxic cells and six aerobic cells were placed in operation. As such, the anaerobic, anoxic and aerobic zones represented approximately 20, 20, and 60%, respectively, of the total reactor volume. A baffle was inserted into the first anoxic cell at the end of Phase I in an attempt to increase the degree of staging. The anoxic recycle was maintained at approximately 100% of the average plant influent flow throughout this entire period. The nitrified recycle was maintained at approximately 100% and the return activated sludge flow was maintained at approximately 60% of the average plant influent flow for most of the period except during Phases IV-A and IV-B when the nitrified recycle was reduced to 60% and the return activated sludge increased to 100%.

During Phases IV-D and IV-E and all of Phase V, reactor configurations and recycle rates were significantly changed to investigate the effect of those parameters on overall system performance. During Phase IV-D, another anoxic reactor was placed in service, for a total of three reactors. Two anaerobic and six aerobic tanks were used as before. During Phase IV-E, the third anoxic reactor was taken out of service but another anaerobic reactor was added. The baffle previously inserted was also removed at that time. The anoxic recycle and nitrified recycle flow rates were maintained at 100% of plant influent flow and the recycle activated sludge flow was maintained at 60% of influent flow throughout that period.

During Phase V-C, additional phosphate was added to the pilot plant influent to stress the system. During Phase V-D, the third anoxic reactor was placed back in service (for a total of anaerobic and three anoxic reactors) and two aerobic reactors were taken out of service (making a total of four). The anoxic recycle and nitrified recycle flow rates were maintained at 100% of influent flow and the return activated sludge rate was maintained at 60% of influent flow. This same reactor configuration was maintained during Phase V-E, but the nitrified recycle rate was increased to approximately 690 percent of influent flow. No preaeration system was used during Phases IV-C through V-A.

During Phase VI, the pilot plant was operated in the "$A^2/O$" mode, i.e., following the teaching of U.S. Pat. No. 4,056,465 with settled sludge returned to an initial anaerobic contact zone.

Table 1 summarizes influent waste water characteristics experienced during the pilot plant program. Periods of steady-state operation are presented separate from the average values for the entire period; however, the data for the steady-state period are included in the average values for the entire period. The influent waste water had a BOD concentration ranging from approximately 110 to 200 mg/l and a TSS concentration ranging from approximately 120 to 185 mg/l. Approximately 35 to 50 percent of the BOD was soluble, as defined by filtration through an 0.45-$\mu$ membrane filter. The COD/BOD ratio varied from approximately 1.8 to 2.7, with an average of 2.5. The soluble COD (0.45-$\mu$ membrane filter) was approximately 30 percent of the total COD. The suspended solids were approximately 80 percent volatile. Hydrogen sulfide values ranged from 1.9 to 8.8 mg/l on the average, and were highest in the late summer (August and September) and lowest in the winter.

Total phosphate concentrations varied from 4.0 to 6.8 mg-P/l, and soluble orthophosphate concentrations varied from 2.4 to 4.2 mg-P/l. TKN concentrations varied from 21.5 to 29.3 mg-N/l, while ammonia concentrations varied from 13.8 to 18.9 mg-N/l. Influent NOX (Nitrite plus nitrate) concentrations were negligible.

Table 2 summarizes the preaeration system performance. When in service, the preaeration system increased the dissolved oxygen (DO) concentration of the influent waste water to approximately 3 mg/l. From 20 to 45 percent of the influent hydrogen sulfide was also removed. Soluble COD removal ranged from 0 to 25 percent.

Tables 3 and 4 summarize the performance of the preaeration and primary treatment systems. The total suspended solids (TSS) removal efficiency initially averaged 30 to 35 percent (Phases I and II), which was somewhat less than typically expected for domestic waste water. During Phases III-A, III-B, and III-C, apparent negative TSS removal efficiencies were reported. This anomaly was thought to result from sampling problems. Thus, between Phases III-C and III-D, the primary clarifier was tapped to allow adequate flushing of the sample line prior to sample collection. Following this modification, TSS removal efficiencies of 30 to 60 percent were observed.

Removal patterns for total BOD, total COD, total phosphate, and TKN were similar to but less pronounced than those observed for TSS. These observations are consistent with the hypothesis that the primary effluent samples contained non-representative quantities of TSS during Phases III-A, III-B and III-C. The increase in total and soluble phosphate during Phases V-C and V-CS was a result of phosphate addition to stress the system. Approximately 10 to 30 mg/l of soluble COD (10 to 15 percent of influent values) and approximately 5 to 15 mg/l of soluble BOD (5 to 30 percent of influent values) were removed through preaeration and primary treatment. In contrast, the concentration of soluble phosphate tended to increase slightly.

Tables 3 and 4 also show measured primary effluent characteristics for the test period. The values reported for Phases III-A, III-B, and III-C indicate the general characteristics of the waste water. Measured total BOD concentrations ranged from approximately 90 to 130 mg/l. The soluble BOD concentration (0.45-μ membrane filter) ranged from 30 to 70 mg/l, and represented 25 to 50 percent of the primary effluent total BOD. The COD/BOD ratio is similar to that of the influent waste water, as is the soluble fraction of COD. Reported TSS values were variable but were less than 90 mg/l after Phase III-D (when sampling was considered to be the most representative). The TSS were approximately 80 percent volatile.

The total and soluble phosphate concentrations in the primary effluent were similar to the influent values. The total BOD/PO4 ratio of the primary effluent averaged about 20, while the soluble BOD/soluble PO4 ratio ranged from about 10 to 15. The exceptions are Phases V-C and VI-B, where phosphate was added. These ratios indicate a waste water that is reasonably well suited for biological phosphorus removal (i.e., with sufficient organic matter present to drive phosphate removal). The TKN, ammonia, and NOX (nitrite plus nitrate) concentrations were as expected for a waste water of this type.

Table 5 (two pages) summarizes process operating conditions for the various operating phases, while Table 6 summarizes overall performance.

During the course of the pilot plant study, flow-proportioned grab composite samples were collected at the following locations:

raw influent
preaeration effluent
primary effluent
anaerobic effluent
anoxic effluent
aerobic effluent
return activated sludge
secondary effluent The anaerobic effluent, anoxic effluent, and aerobic effluent samples were collected directly from the last cell of the respective reactor zones. For example, anaerobic effluent was collected directly from the third anaerobic cell (115 on FIG. 1). Samples from each location were collected every 2 hours and an aliquot proportional to pilot plant influent flow at the time of collection was transferred to a large container. These containers were stored in a 4° C. refrigerator at all times. Sample date corresponded to the calendar day (midnight to midnight). Following completion of the 24-hour sampling cycle, each sample was thoroughly mixed and a representative sample transferred to a smaller container for later analysis.

Grab samples were also collected through each cell of the biological reactor by the pilot plant operator. These samples were centrifuged immediately upon collection and then filtered through prewashed 0.45 μ membrane filters. The collected solids were discarded and the filtrate retained for analysis. Individual samples for the various cells of the biological reactor were collected in a sequential fashion according to the calculated reactor flow-through times, so that a "slug" of influent waste water could be followed through. The filtered samples were analyzed for nutrient concentrations.

The overall performance data collected during the pilot plant program is summarized in Table 6 and demonstrates that a biological nutrient removal process in accordance with the invention to achieve high levels of phosphorus and nitrogen removal with low hydraulic residence times, e.g., enhanced nitrogen and hydraulic residence times as low as 3.7 hours for summertime conditions and slightly over 7 hours for winter conditions. Secondary treatment standards (30 mg/l BOD, 30 mg/l TSS) were also routinely satisfied.

The results of the pilot plant study also indicate that 67 percent of the total phosphorus on a yearly basis could be removed with only seasonal variations in continuous nitrogen removal. Effluent soluble (0.45-μ membrane filter) $BOD_5$ consistently averaged 1 mg/l, except during start-up, transition periods, and during cold weather operation when they were slightly higher. Effluent total phosphorus concentrations routinely averaged 1.5 mg/l or less, and removal efficiencies ranged from 75 to more than 90 percent during periods of good performance.

Essentially complete nitrification was observed during several phases of the pilot plant program. Total nitrogen removal approached 70 percent during these same periods. Reduced total nitrogen removal was observed when nitrification was not complete However, during these periods not all of the available nitrogen was converted to nitrate, thus limiting the mass of nitrogen that could be denitrified in the anoxic zone. Effluent alkalinity values ranged from 65 to 108 mg/l, and effluent pH values always exceeded 7. However, effluent alkalinities would be greater than expected if denitrification had not occurred in the biological process.

The results of pilot study also suggest that biologically enhanced phosphorus removal may be adversely affected by long aerobic hydraulic residence times and by an oxidation-reduction potential in the anaerobic zone greater than about $-150$ mv. Incomplete denitrification of in the anoxic zone could also adversely affect anaerobic zone oxygen reduction potential due to the recycle of nitrate from the anoxic to the anaerobic zone by the anaerobic recycle. In this regard, the anaerobic zone hydraulic residence time did not appear to affect phosphorus removal over the range of approximately 0.7 to 2.4 hours.

Figure 4:
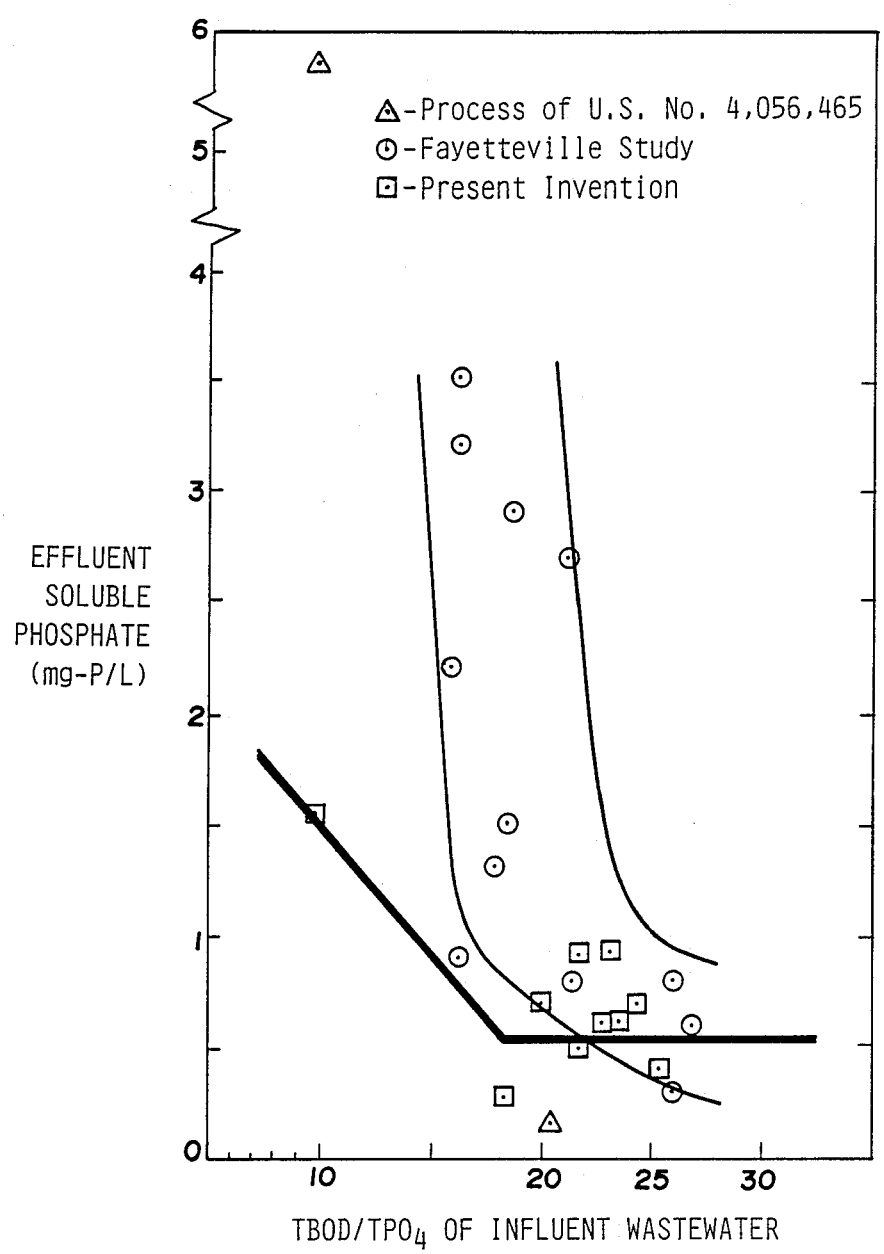
FIG. 4 is a comparative graphical representation of the effect of waste water TBOD/TPO$_4$ on effluent soluble phosphate for two prior art systems and the process according to the invention.

Tables 5 and 6 also illustrate the significant differences in phosphorous removal capability between the process according to U.S. Pat. No. 4,056,465 (Phase VI of the pilot plant program) and the process according to the present invention. For example, Table 5 under the column "SVI" shows improved settling characteristics of the sludge during phase VI. However, Table 6 also shows the significantly reduced phosphorous removal capabilities of the '465 process during periods of increased phosphorous loading (compare the removed phosphorous levels during phases V-C and V-CS with the levels in phases VI-B and VI-BS). Likewise, FIG. 4 of the drawings compares the overall phosphorous removal capabilities of the present invention to the process disclosed in U.S. Pat. No. 4,056,465 and a third conventional system using the '465 process over a longer period of time. FIG. 4 plots the data for each of the phases (except for Phases III-A and III-B, when poor phosphorous removal was observed due to underloading problems), as well as data from a recently completed biological phosphorous removal and nitrification pilot plant study using the U.S. Pat. No. 4,056,465 process. The latter study was conducted at the City of Fayetteville, Ark., Wastewater Treatment Plant. The results of this comparison indicate excellent phosphorous removal capability for the pilot plant using the process according to the invention and suggest a potential higher phosphorous removal capability for waste water characteristics typically considered unsuitable for biological phosphorous removal.

What is claimed is:

1. In a biological waste water treatment process, a method for removing organic matter, phosphorus and nitrogen from influent waste water comprising the steps of:
   (a) introducing influent waste water to an upstream-most one of an anaerobic reactor in an anaerobic zone which includes multiple serially fluid-connected one of said anaerobic reactors;
   (b) introducing effluent from a downstream-most one of said anaerobic reactors in said anaerobic zone to an upstream-most one of an anoxic reactor which is serially fluid-connected to other downstream anoxic reactors;
   (c) introducing the effluent from a downstream-most one of said anoxic rectors in said anoxic zone to a downstream aerobic zone which includes multiple serially fluid-connected aerobic reactors in which dissolved oxygen is brought into contact with said anoxic zone effluent to produce a nitrified mixed liquor and wherein an upstream one of said anoxic reactors has a hydraulic residence time which is substantially equal to the hydraulic residence time of another downstream one of said anoxic reactors;
   (d) separating the effluent from said aerobic zone into a layer of activated sludge and a clarified supernatant having reduced levels of nitrogen and phosphorus;
   (e) recycling a portion of said activated sludge to the process stream entering said upstream-most one of said anoxic reactors in said anoxic zone;
   (f) removing a portion of said activated sludge as waste;
   (g) recycling to said upstream-most one of said anaerobic reactors a portion of said anoxic zone effluent from at least said downstream-most one of said anoxic reactors; and
   (h) recycling to said upstream-most one of said anoxic reactors said nitrified mixed liquor produced in said aerobic zone.

2. A process according to claim 1, wherein said effluent from said downstream-most one of said anoxic reactors in said anoxic zone is introduced into said upstream-most aerobic reactor and thereafter into each of said serially fluid-connected downstream aerobic reactors.

3. A process according to claim 1, wherein the time required to complete steps (a), (b), (c) and (d) define a mean cell residence time of about six days for process temperatures of 20° C. or higher.

4. A process according to claim 1, wherein the time required to complete steps (a), (b), (c) and (d) define a mean cell residence time of about 12 days for process temperatures of between 10° and 20° C.

5. A process according to claim 1 further comprising the step of substantially denitrifying the liquor in said anoxic zone to reduce the recycle of nitrate from said anoxic zone to said anaerobic zone.

6. A process according to claim 1 wherein said aerobic zone accumulates quantities of phosphorus in excess of that required for cell growth and reproduction of microorganisms in said waste water;

7. A process according to claim 1, wherein said anoxic zone denitrifies said waste water thereby releasing nitrogen gas;

8. A process according to claim 1, wherein said step (a) further comprises the step of maintaining biological solids in suspension in said anaerobic zone.

9. A process according to claim 1, wherein the flow rate of said recycled portion of said anoxic zone effluent in step (g) is about 0.5 to 2.0 times the flow rate of said influent waste water.

10. A process according to claim 1, wherein the hydraulic residence time for step anoxic zone is about 0.5 to 2.0 hours.

11. A process according to claim 1, wherein the flow rate of said recycling activated sludge in step (e) to said anoxic zone is about 0.5 to 2.0 times the flow rate of said influent waste water.

12. A process according to claim 1, wherein the flow rate of said recycled nitrified mixed liquor from said aerobic zone is less than about four times the flow rate of said influent waste water.

13. A process according to claim 1, wherein the concentration of dissolved oxygen in said aerobic zone is at least 0.5 mg/l.

14. A process according to claim 1, wherein the hydraulic residence time for said anaerobic zone is about 0.5 to 2.0 hours.

* * * * *